United States Patent
Johnson et al.

(10) Patent No.: US 9,828,523 B2
(45) Date of Patent: *Nov. 28, 2017

(54) AIR AND WATER BARRIER

(71) Applicant: Dow Corning Corporation, Midland, MI (US)

(72) Inventors: William Johnson, Midland, MI (US); Andrea Watts, Alexandria, VA (US)

(73) Assignee: DOW CORNING CORPORATION, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,892

(22) Filed: Nov. 9, 2016

(65) Prior Publication Data

US 2017/0051179 A1 Feb. 23, 2017

Related U.S. Application Data

(63) Continuation of application No. 14/760,293, filed as application No. PCT/US2014/011048 on Jan. 10, 2014, now Pat. No. 9,523,022.

(60) Provisional application No. 61/751,428, filed on Jan. 11, 2013, provisional application No. 61/824,152, filed on May 16, 2013, provisional application No. 61/905,465, filed on Nov. 18, 2013.

(51) Int. Cl.

| | |
|---|---|
| C09D 183/06 | (2006.01) |
| C09D 183/04 | (2006.01) |
| C09D 7/12 | (2006.01) |
| E04B 2/00 | (2006.01) |
| C08K 3/00 | (2006.01) |
| C08K 3/36 | (2006.01) |
| C08K 5/00 | (2006.01) |
| C08K 5/06 | (2006.01) |
| C08L 83/04 | (2006.01) |
| E04B 1/66 | (2006.01) |
| C08G 77/16 | (2006.01) |
| C08K 3/22 | (2006.01) |
| C08K 3/26 | (2006.01) |

(52) U.S. Cl.
CPC .......... *C09D 183/04* (2013.01); *C08K 3/0008* (2013.01); *C08K 3/26* (2013.01); *C08K 3/36* (2013.01); *C08K 5/0008* (2013.01); *C08K 5/06* (2013.01); *C08L 83/04* (2013.01); *C09D 7/1216* (2013.01); *C09D 183/06* (2013.01); *E04B 1/66* (2013.01); *E04C 2/44* (2013.01); *C08G 77/16* (2013.01); *C08K 2003/2237* (2013.01); *C08K 2003/2241* (2013.01); *C08K 2003/265* (2013.01); *C08L 2201/52* (2013.01); *C08L 2312/00* (2013.01); *C08L 2312/08* (2013.01)

(58) Field of Classification Search
CPC .......... C08G 77/16; C08G 77/26; C08K 3/36; C07F 7/081
See application file for complete search history.

(56) References Cited

U.S. PATENT DOCUMENTS

| | | | |
|---|---|---|---|
| 2,676,182 A | 4/1954 | Daudt et al. | |
| 3,382,205 A | 5/1968 | Beers | |
| 4,677,160 A | 6/1987 | Kondo et al. | |
| 5,034,455 A | 7/1991 | Stein et al. | |
| 5,037,878 A | 8/1991 | Cerles et al. | |
| 5,777,026 A * | 7/1998 | Berg | C08J 3/03 524/457 |
| 9,523,022 B2 * | 12/2016 | Johnson | C09D 183/04 |
| 2008/0107815 A1 | 5/2008 | Schneider et al. | |
| 2014/0196396 A1 | 7/2014 | Watts et al. | |
| 2015/0361302 A1 | 12/2015 | Johnson et al. | |

FOREIGN PATENT DOCUMENTS

| | | |
|---|---|---|
| EP | 0 915 122 A1 | 5/1999 |
| WO | WO 2012/064611 A1 | 5/2012 |

OTHER PUBLICATIONS

International Search Report for Application No. PCT/US2014/011048 dated Feb. 26, 2014, 4 pages.

Anonymous, "IUPAC Gold Book—Catalyst", Aug. 19, 2012, XP055103032, Retrieved from the Internet: URL:http//goldbook.iupac.org/C00876.html [retrieved on Feb. 3, 2015].

Anonymous, "Sealant—Definition and More from the Free Merriam-Webster Dictionary", Feb. 19, 2014, XP055103051, Retrieved from the Internet: URL:http://www.merriam-webster.com/dictionary/sealant [retrieved on Feb. 19, 2014].

\* cited by examiner

*Primary Examiner* — Kuo-Liang Peng
(74) *Attorney, Agent, or Firm* — Howard & Howard Attorneys PLLC

(57) ABSTRACT

A method for decreasing the vapor permeability of a water and air barrier treated substrate that includes treating the substrate with a liquid applied, vapor permeable air and water barrier coating composition comprising a cross-linked polysiloxane dispersion composition.

19 Claims, No Drawings

AIR AND WATER BARRIER

RELATED APPLICATIONS

This application is Continuation of U.S. patent application Ser. No. 14/760,293, filed on Jul. 10, 2015, which is the National Stage of International Patent Application No. PCT/US2014/011048, filed on Jan. 10, 2014, which claims priority to and all the advantages of U.S. Patent Application No. 61/751,428, filed on Jan. 11, 2013, 61/824,152, filed May 16, 2013, and 61/905,465, filed Nov. 18, 2013, the contents of which are incorporated herein by reference.

TECHNICAL FIELD

This disclosure relates to the use of a cross-linked polysiloxane dispersion composition as a vapour permeable air and water barrier in the construction industry.

BACKGROUND

A wide variety of air and water barrier systems are used in both new building and remedial construction applications. These barrier systems are designed to eliminate uncontrolled air and water leakage through e.g. exterior walls and/or facades enabling the control of e.g. temperature, humidity levels, moisture levels and air quality throughout a building thereby minimising, for example, the possibility of damp problems and/or the chance of mould growth and poor air quality.

Air barriers are designed to minimise and potentially exclude the passage of air through, e.g., walls. Water barriers are intended to minimise or exclude the ingress of liquid water from entering a building through a wall or façade or the like e.g. via capillary action through cracks, holes or porous materials. The application of such barrier systems to constructions, e.g. cavity wall systems, results in energy cost savings and may significantly reduce the ingress of airborne pollutants by substantially reducing the amount of air leakage through the exterior walls or facades of a building.

A single material can function as an air and water barrier. Air and water barriers are typically found in two forms, sheet materials and liquid coating compositions. Each type is usually designed to be either (water) vapour permeable or impermeable. Vapour Impermeable Air and water barrier coatings effectively block the transfer of water vapour through the coating, whilst vapour permeable Air and water barrier coatings control the amount of (water) vapour diffusing through a wall due to variable vapour pressures. Unless prevented or controlled, water vapour will naturally move from a high concentration to a lower concentration until it is in balance. Hence, if the vapour pressure is high outside the wall and low inside the wall, vapour will be directed inward (and vice versa).

The use of liquid-applied vapour permeable air and water barriers for wall assemblies has only recently significantly increased, not least because air leakage has become recognized as a potential source of moisture accumulation in walls. This type of air and water barrier is designed to allow moisture vapour to pass through the membrane, promoting diffusion. Determining whether to use a vapour permeable or vapour impermeable air and water barrier (and indeed the degree of vapour permeability in a selected barrier) is determined through local climate of the building and the wall design itself i.e. the inter-relationship of the air/water barrier and the insulation layer are located in relation to each other in the wall.

Liquid-applied Vapour permeable, air and water barrier coatings can be formed by applying a liquid coating composition onto a suitable internal building construction surface. Liquid-applied air and water barriers are rolled, sprayed or trowelled onto substrates and become part of the internal structural wall. Because of the way they are applied, there are no fastener holes from the installation where water penetration may occur, and there is no potential for mislapping or tearing, as with many sheet materials.

Another important distinction of a liquid-applied air and water barrier in wall assemblies is that they can minimize application error and unintentional air infiltration caused by the over-lapping of sheet applied materials. The liquid-applied materials are applied and dry or cure as a monolithic membrane around the building envelope.

A variety of both vapour permeable and impermeable air and water barrier coatings are commercially available with the vast majority being organic based coatings. Unfortunately however, these organic based coatings have compatibility issues with silicone based materials, such as caulks and weather sealants. The lack of compatibility may lead to the inability to use such silicone materials or the need for complex and potentially additional layers of adhesives, primers and/or adhesion promoters prior to application of silicone caulks and/or sealants etc. This renders the construction process more expensive and complicated as it may necessitate additional labour and more complicated application processes in order to provide a "weather-tight" building.

Another disadvantage with organic coatings of the type currently used for currently typically used is that they have poor UV stability (unlike silicone based materials) and as such cannot be exposed to UV radiation for extended periods of time during construction without necessitating re-application of one or more additional coating layer(s), which obviously adds to the cost of the process. WO2012/064611 proposes a silicone based fluid applied silicone air and water barrier system.

SUMMARY OF INVENTION

It has been surprisingly identified that a one-component cross-linked polysiloxane dispersion composition may be used as a liquid applied, vapour permeable air and water barrier coating composition for application to internal wall assemblies.

There is provided herein the use of a cross-linked polysiloxane dispersion composition comprising
  (i) a crosslinked polysiloxane dispersion of a reaction product of (a) a siloxane polymer having at least two —OH groups per molecule, or polymer mixture having at least two —OH groups per molecule, having a viscosity of between 5,000 to 500,000 mPa·s at 25° C., and (b) at least one self catalyzing crosslinker reactive with (a), and additionally comprising (c) a surfactant and (d) water;
together with one or more of the following ingredients:
  (ii) one or more fillers selected from the group of colloidal silica, fumed silica, precipitated silica, diatomaceous earths, ground quartz, kaolin, calcined kaolin, wollastonite, hydroxyapatite, calcium carbonate, hydrated alumina, magnesium hydroxide, carbon black, titanium dioxide, aluminium oxide, vermiculite, zinc oxide, mica, talcum, iron oxide, barium sulphate and slaked lime;

(iii) one or more stabilizers;
(iv) one or more rheology modifiers as a liquid applied, vapour permeable air and water barrier coating composition.

There is also provided herein a method for decreasing the vapour permeability of a water and air barrier treated substrate by treating said substrate with a liquid applied, vapour permeable air and water barrier coating composition comprising a cross-linked polysiloxane dispersion composition comprising
  (i) a crosslinked polysiloxane dispersion of a reaction product of (a) a siloxane polymer having at least two —OH groups per molecule, or polymer mixture having at least two —OH groups per molecule, having a viscosity of between 5,000 to 500,000 mPa·s at 25° C., and (b) at least one self catalyzing crosslinker reactive with (a), and additionally comprising (c) a surfactant and (d) water;
together with one or more of the following ingredients:
  (ii) one or more fillers selected from the group of colloidal silica, fumed silica, precipitated silica, diatomaceous earths, ground quartz, kaolin, calcined kaolin, wollastonite, hydroxyapatite, calcium carbonate, hydrated alumina, magnesium hydroxide, carbon black, titanium dioxide, aluminium oxide, vermiculite, zinc oxide, mica, talcum, iron oxide, barium sulphate and slaked lime;
  (iii) one or more stabilizers; and
  (iv) one or more rheology modifiers There is also provided herein a wall assembly comprising a liquid applied, vapour permeable air and water barrier coating composition comprising a cross-linked polysiloxane dispersion composition comprising
  (i) a crosslinked polysiloxane dispersion of a reaction product of (a) a siloxane polymer having at least two —OH groups per molecule, or polymer mixture having at least two —OH groups per molecule, having a viscosity of between 5,000 to 500,000 mPa·s at 25° C., and (b) at least one self catalyzing crosslinker reactive with (a), and additionally comprising (c) a surfactant and (d) water;
together with one or more of the following ingredients:
  (ii) one or more fillers selected from the group of colloidal silica, fumed silica, precipitated silica, diatomaceous earths, ground quartz, kaolin, calcined kaolin, wollastonite, hydroxyapatite, calcium carbonate, hydrated alumina, magnesium hydroxide, carbon black, titanium dioxide, aluminium oxide, vermiculite, zinc oxide, mica, talcum, iron oxide, barium sulphate and slaked lime;
  (iii) one or more stabilizers; and
  (iv) one or more rheology modifiers.

DESCRIPTION

The liquid applied, vapour permeable air and water barrier coating composition as hereinbefore described is applied at a wet thickness of from 20 mil (0.508 mm) to 50 mil (1.27 mm), or from 20 to 60 mil (1.524 mm) and dries subsequent to application to a dry thickness of from 10 mil (0.254 mm) to 25 mil (0.635 mm), or from 10 to 30 mil (0.762 mm). Depending on temperature, humidity and wind conditions, the average drying time of the composition is from about 4 to 12 hours and full adhesion and physical properties will be present after only a few days.

The liquid applied, vapour permeable air and water barrier coating composition as hereinbefore described, once dried on a substrate, meets the requirements of ASHRAE 90.1-2010 for ASTM E2178-11, Standard Test Method for Air Permeance of Building Materials, having an Air Permeance (L/s per m$^2$) of less than 0.006 at a differential pressure of 75 Pa at thicknesses of both 10 mil (0.254 mm) and 15 mil (0.381 mm).

The liquid applied, vapour permeable air and water barrier coating composition, once dried, has a Water Vapour Transmission of greater than 7 US Perm (400.49 ng·s$^{-1}$m$^{-2}$ Pa$^{-1}$), greater than 10 US Perm (572.135 ng·s$^{-1}$m$^{-2}$ Pa$^{-1}$), or greater than 15 US Perm (858.2035 ng·s$^{-1}$m$^{-2}$ Pa$^{-1}$), according to the Dry Cup Desiccant Method of ASTM E96/E96M-10 for both the 10 mil (0.254 mm) and 15 mil (0.381 mm) thicknesses, Standard Test Method for Water Vapour Transmission rate of Materials and in accordance with Water Vapour Transmission Wet Cup Water Method of ASTM E96/E96M-10, Standard Test Method for Water Vapour Transmission rate of Materials of greater than 20 US Perm (1144.27 ng·s$^{-1}$m$^{-2}$ Pa$^{-1}$), greater than 24 US Perm (1373.12 ng·s$^{-1}$m$^{-2}$ Pa$^{-1}$), greater than 25 US Perm (1430.3375 ng·s$^{-1}$m$^{-2}$ Pa$^{-1}$), or greater than 30 US Perm (1716.41 ng·s$^{-1}$m$^{-2}$ Pa$^{-1}$) for coatings of 10 mil (0.254 mm) thickness and for coatings of 15 mil (0.381 mm) thicknesses.

Furthermore, the liquid applied, vapour permeable air and water barrier coating composition as hereinbefore described, once dried passes the Self Sealability (Head of Water) Test described in Section 8.9 of ASTM D1970-09.

The wall assembly described herein can comprise the use of the liquid applied, vapour permeable air and water barrier coating composition as an adhesive to bond elastomer material(s) to construction sheathing substrate(s), metal substrate(s) such as painted or unpainted aluminium substrates, galvanized metal substrate(s), wood framing substrate(s) and the like. Other suitable substrates include, for the sake of example, concrete, oriented strand board (OSB), exterior sheathing, preformed panels, plywood and wood or steel stud walls.

All viscosity measurements of siloxane materials are made at 25° C. using a recording Brookfield viscometer with Spindle 3 at 2 rpm according to ASTM D4287-00(2010) unless otherwise indicated.

The liquid applied, vapour permeable air and water barrier coating composition comprises a crosslinked polysiloxane dispersion containing a reverse phase emulsion of:
  (i) a reaction product of (a) a siloxane polymer having at least two —OH groups per molecule, or polymer mixture having at least two —OH groups per molecule, having a viscosity of between 5,000 to 500,000 mPa·s at 25° C., and (b) at least one self catalyzing crosslinker reactive with (a), additionally comprising (c) a surfactant and (d) water;
together with one or more of the following ingredients:
  (ii) one or more fillers selected from the group of colloidal silica, fumed silica, precipitated silica, diatomaceous earths, ground quartz, kaolin, calcined kaolin, wollastonite, hydroxyapatite, calcium carbonate, hydrated alumina, magnesium hydroxide, carbon black, titanium dioxide, aluminium oxide, vermiculite, zinc oxide, mica, talcum, iron oxide, barium sulphate and slaked lime;
  (iii) one or more stabilizers; and
  (iv) one or more rheology modifiers.

The reaction product (i) may additionally comprise one or more additives such as in-situ resin reinforcers, stabilizers, e.g. pH stabilizers, fillers and the like may also be added to the mixture. The dispersion is produced by mixing the above components at a sufficiently high shear to transform the mixture into a gel phase and by then diluting the gel with water to the desired silicone content.

The siloxane polymers or polymer mixtures (a) used as starting materials for the reaction product (i) above have a viscosity between 5,000 to 500,000 mPa·s. at 25° C. using a recording Brookfield viscometer with Spindle 3 at 2 rpm according to ASTM D4287-00(2010). The siloxane polymers are described by the following molecular Formula (1)

$$X_{3-n}R_n-YO-(R^1{}_2SiO)_z-Y-R_nX_{3-n} \quad (1)$$

where n is 0, 1, 2 or 3, z is an integer from 500 to 5000 inclusive, X is a hydrogen atom, a hydroxyl group and any condensable or any hydrolyzable group, Y is a Si atom or an Si—$(CH_2)_m$—$SiR^1{}_2$ group, R is individually selected from the group consisting of aliphatic, alkyl, aminoalkyl, polyaminoalkyl, epoxyalkyl, alkenyl or aromatic aryl groups and $R^1$ is individually selected from the group consisting of X, aliphatic, alkyl, alkenyl and aromatic groups.

The siloxane polymer (a) can be a single siloxane represented by Formula (1) or it can be mixtures of siloxanes represented by the aforesaid formula or solvent/polymer mixtures. The term "polymer mixture" is meant to include any of these types of polymers or mixtures of polymers. As used herein, the term "silicone content" means the total amount of silicone in the dispersed phase of the dispersion, from whatever source, including, but not limited to the silicone polymer, polymer mixtures, self catalytic crosslinkers, in situ resin reinforcers and stabilizers.

Each X group may be the same or different and can be a hydrogen atom, hydroxyl group and any condensable or hydrolyzable group. The term "hydrolyzable group" means any group attached to the silicon which is hydrolyzed by water at room temperature. The hydrolyzable group X includes hydrogen atom, halogen atoms, such as F, Cl, Br or I; groups of the Formula —OT, where T is any hydrocarbon or halogenated hydrocarbon group, such as methyl, ethyl, isopropyl, octadecyl, allyl, hexenyl, cyclohexyl, phenyl, benzyl, beta-phenylethyl; any hydrocarbon ether radical, such as 2-methoxyethyl, 2-ethoxyisopropyl, 2-butoxyisobutyl, p-methoxyphenyl or —$(CH_2CH_2O)_2CH_3$; or any N,N-amino radical, such as dimethylamino, diethylamino, ethylmethylamino, diphenylamino or dicyclohexylamino. X can also be any amino radical, such as $NH_2$, dimethylamino, diethylamino, methylphenylamino or dicyclohexylamino; any ketoxime radical of the formula —ON=$CM_2$ or —ON=CM' in which M is any monovalent hydrocarbon or halogenated hydrocarbon radical, such as those shown for T above and M' is any divalent hydrocarbon radical, both valences of which are attached to the carbon, such as hexylene, pentylene or octylene; ureido groups of the formula —N(M)CONM''$_2$ in which M is defined above and M'' is hydrogen atom or any of the above M radicals; carboxyl groups of the formula —OOCMM'' in which M and M'' are defined above or carboxylic amide radicals of the formula —NMC=O(M'') in which M and M'' are defined above. X can also be the sulphate group or sulphate ester groups of the formula —$OSO_2$(OM), where M is as defined above; the cyano group; the isocyanate group; and the phosphate group or phosphate ester groups of the formula —$OPO(OM)_2$ in which M is defined above.

The most preferred X groups of the invention are hydroxyl groups or alkoxy groups. Illustrative alkoxy groups are methoxy, ethoxy, propoxy, butoxy, isobutoxy, pentoxy, hexoxy and 2-ethylhexoxy; dialkoxy radicals, such as methoxymethoxy or ethoxymethoxy and alkoxyaryloxy, such as ethoxyphenoxy. The most preferred alkoxy groups are methoxy or ethoxy.

R is individually selected from the group consisting of aliphatic, alkyl, aminoalkyl, polyaminoalkyl, epoxyalkyl, alkenyl organic and aromatic aryl groups. Most preferred are the methyl, ethyl, octyl, vinyl, allyl and phenyl groups.

$R^1$ is individually selected from the group consisting of X, aliphatic, alkyl, alkenyl and aromatic aryl groups. Most preferred are methyl, ethyl, octyl, trifluoropropyl, vinyl and phenyl groups.

When the siloxane polymer of formula (1) has an average of more than two condensable or hydrolyzable groups per molecule which are self catalytic, it is not necessary to have the self catalytic crosslinker present separately to form a crosslinked polymer. The condensable or hydrolyzable groups on the different siloxane molecules can react with each other to form the required crosslinks.

The siloxane polymer (a) can be a mixture of different kinds of molecules, for example, long chain linear molecules and short chain linear or branched molecules. These molecules may react with each other to form a crosslinked network. Such siloxanes, which can take the place of more conventional crosslinkers, are illustrated by low molecular weight organosilicon hydrides, such as polymethylhydrogensiloxane, low molecular weight copolymers containing methylhydrogensiloxy and dimethylsiloxy groups, —(OSi(OEt)$_2$)—, (ethylpolysilicate), $(OSiMeC_2H_4Si(OMe)_3)_4$ and $(OSi—MeON=CR'_2)_4$, where Me is methyl and Et is ethyl.

Advantageously, the siloxane polymer (a) also comprises mixtures of siloxane polymers of formula (1), exemplified by, but not limited to, mixtures of α, ω-hydroxysiloxy terminated siloxanes and of α,ω-bis(triorganosiloxy) terminated siloxanes, mixtures of α,ω-hydroxylsiloxy terminated siloxanes and of ω-hydroxy, triorganosiloxy terminated siloxanes, mixtures of α,ω-dialkoxysiloxy terminated siloxanes and of α,ω-bis(tri-organosiloxy) terminated siloxanes, mixtures of α,ω-dialkoxysiloxy terminated siloxanes and of α,ω-hydroxysiloxy terminated siloxanes, mixtures of α,ω-hydroxysiloxy terminated siloxanes and of α,ω-bis(triorganosiloxy) terminated poly(diorgano)(hydrogenorgano)siloxane copolymers. The siloxane polymer of the invention can also comprise mixtures of siloxane polymers of formula (1) as described above with liquid, branched methylpolysiloxane polymers ("MDT fluids") comprising a combination of recurring units of the formulae:

$(CH_3)_3SiO_{1/2}$ ("M")

$(CH_3)_2SiO$ ("D")

$CH_3SiO_{3/2}$ ("T")

and containing from 0.1 to 8% hydroxyl groups. The fluids may be prepared by co-hydrolysis of the corresponding chloro- or alkoxy-silanes, as described, for example, in U.S. Pat. No. 3,382,205. The proportion of MDT fluids added should not exceed 50 parts, preferably of 1 to 20 parts by weight, per 100 parts by weight of the polymer of Formula (1), to achieve improved physical properties and adhesion of the resultant polymers. The siloxane polymer of the present invention can also comprise mixtures of siloxane polymers of Formula (1) with liquid or solid, branched methylsiloxane polymeric resins comprising a combination of recurring units of the formulae:

$(CH_3)_3SiO_{1/2}$ ("M")

$(CH_3)_2SiO$ ("D")

$CH_3SiO_{3/2}$ ("T")

$SiO_{4/2}$ ("Q")

and containing from 0.1 to 8% hydroxyl groups, the fluids may be prepared by co-hydrolysis of the corresponding chloro- or alkoxy-silanes, as described, for example in U.S. Pat. No. 2,676,182. The MDTQ fluid/resin may be added in a proportion not exceeding 50 parts, preferably of 1 to 10 parts by weight, per 100 parts by weight of the polymer of Formula (1) to improve physical properties and adhesion of the resultant polymers. MDTQ fluids/resins can also be mixed with MDT fluids and the polymers of Formula (1).

Finally, the siloxane polymer (a) can comprise mixtures of siloxane polymers of Formula (1) with compatible organic solvents, to form organic polymer/solvent mixtures. These organic solvents are exemplified by organophosphate esters, alkanes, such as hexane or heptane; higher paraffins; and aromatic solvents, such as toluene or benzene. The polymer solvent mixtures can also be added with MDT fluids and/or MDTQ fluids to the polymer of Formula (1). Any of the above mixtures of polymers or polymer/solvents can be prepared by mixing the ingredients prior to emulsification or by emulsifying them individually and then mixing the prepared emulsions.

The at least one self catalytic crosslinker (b) reactive with (a) to form reaction product (i) is present in the amount of 1 to 5 parts by weight per 100 parts of siloxane polymer. The term "self catalytic crosslinker" means a molecule that has at least one group serving as the catalytic species. While in certain circumstances only one self catalytic crosslinker may be needed to produce an elastomer having the desired physical properties, those skilled in the art will recognize that two or more self catalytic crosslinkers may be added to the reaction mixture to achieve excellent results. In addition, the self catalytic crosslinker or crosslinkers may be added with a conventional catalyst. However, adding the self catalytic crosslinker with a conventional catalyst is not required for the practice of this invention and the compositions contemplated by this invention may in fact be free of said conventional catalysts.

Typical self catalytic crosslinkers include tri or tetra functional compounds, such as $R-Si-(Q)_3$ or $Si-(Q)_4$, where Q is carboxylic, $OC(O)R^4$, e.g., acetoxy and $R^4$ is an alkyl group of 1 to 8 carbon atoms inclusive, preferably methyl, ethyl or vinyl. Other preferred Q groups are the hydroxyl amines, $ON(R^4)_2$, where each $R^4$ is the same or different alkyl group of 1 to 8 carbon atoms inclusive, e.g., $ON(CH_2CH_3)_2$. Q may also be an oxime group, such as $O-N=C(R^4)_2$, where each $R^4$ is the same or different alkyl group of 1 to 8 carbon atoms inclusive, e.g., $O-N=C(CH_3)(CH_2CH_3)$. Further, Q may be an amine group, such as $N(R^5)_2$, where $R^5$ is the same or different alkyl group of 1 to 8 carbon atoms inclusive or cyclic alkyl group, e.g., $N(CH_3)_2$ or $NH(cyclohexyl)$. Finally, Q may be an acetamido group, $NRC(O)R^4$, where $R^4$ is an alkyl group of 1 to 8 carbon atoms inclusive, e.g. $N(CH_3)C(O)CH_3$.

In addition, partial hydrolysis products of the aforementioned compounds may also function as self catalytic crosslinkers. This would include dimers, trimers, tetramers and the like, for example, compounds of the formula:

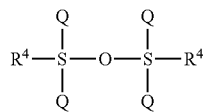

where Q and $R^4$ are defined in the preceding paragraph.

Also useful as self catalytic crosslinkers are those polymeric or copolymeric species containing 3 or more (Q) sites located at either pendant or terminal positions or both on the backbone of a polydiorganosiloxane molecule. Examples of the pendent group include compositions of the following formula:

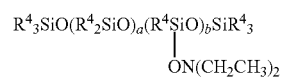

where $R^4$ is the same or different alkyl group of from 1 to 8 carbon atoms inclusive and a is 0 or a positive integer and b is an integer greater than 2. In general, polymeric compositions having either pendent or terminal Q groups may be used in the practice of the present invention, in particular, compounds of the formula:

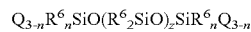

where n is 0, 1, 2 or 3, z is a positive integer, $R^6$ is Q or independently the same or different alkyl chain of 1 to 8 carbon atoms inclusive as long as there are at least three Q groups on the molecule. Q is as described above.

Effective self catalytic crosslinkers are those compounds which form tack free elastomers when mixed with functional silicone polymers in the absence of additional catalysts such as tin carboxylates or amines. In the self catalytic crosslinkers, the acetoxy, oxime, hydroxyl amine (aminoxy), acetamide and amide groups catalyze the formation of Si—O—Si bonds in the reactions contemplated by this invention.

One skilled in the art would recognize that the starting polymer itself could be pre-endblocked with self catalytic crosslinking moieties. Optionally, further self-catalytic crosslinkers can be added to such compositions.

The surfactant (c) may be selected from nonionic surfactants, cationic surfactants, anionic surfactants, amphoteric surfactants or mixtures thereof. The surfactant (c) is present in our composition in an amount of 0.5 to 10 parts by weight of siloxane polymer (a) and is preferably present in the amount of 2 to 10 parts.

Most preferred are nonionic surfactants known in the art as being useful in emulsification of polysiloxanes. Useful nonionic surfactants are polyoxyalkylene alkyl ethers, polyoxyalkylene sorbitan esters, polyoxyalkylene esters, polyoxyalkylene alkylphenyl ethers, ethoxylated amides and others. The surfactants useful in the instant invention may be further exemplified by TERGITOL® TMN-6, TERGITOL® 15S40, TERGITOL® 15S9, TERGITOL® 15S12, TERGITOL® 15S15 and TERGITOL® 15S20, and TRITON® X405 produced by The Dow Chemical Company of Midland, Mich.; BRIJ® 30 and BRIJ® 35; MAKON® 10 produced by STEPAN COMPANY, (Chicago, Ill.); and ETHOMID® 0/17 produced by Akzo Nobel Surfactants (Chicago, Ill.).

Cationic and anionic surfactants known in the art as being useful in emulsification of polysiloxanes are also useful as the surfactant in the instant invention. Suitable cationic surfactants are aliphatic fatty amines and their derivatives, such as dodecylamine acetate, octadecylamine acetate and acetates of the amines of tallow fatty acids; homologues of aromatic amines having fatty chains, such as dodecylanalin; fatty amides derived from aliphatic diamines, such as undecylimidazoline; fatty amides derived from disubstituted amines, such as oleylaminodiethylamine; derivatives of ethylene diamine; quaternary ammonium compounds, such as tallow trimethyl ammonium chloride, dioctadecyldimethyl ammonium chloride, didodecyldimethyl ammonium chloride and dihexadecyldimethyl ammonium chloride; amide derivatives of amino alcohols, such as beta-hydroxyethyl-stearyl amide; amine salts of long chain fatty acids; quaternary ammonium bases derived from fatty amides of di-substituted diamines, such as oleylbenzylaminoethylene diethylamine hydrochloride; quaternary ammonium bases of the benzimidazolines, such as methylheptadecyl benzimidazole hydrobromide; basic compounds of pyridinium and its derivatives, such as cetylpyridinium chloride; sulfonium compounds, such as octadecylsulfonium methyl sulphate; quaternary ammonium compounds of betaine, such as betaine compounds of diethylamino acetic acid and octadecylchloromethyl ether; urethanes of ethylene diamine, such as the condensation products of stearic acid and diethylene triamine; polyethylene diamines and polypropanolpolyethanol amines.

Cationic surfactants commercially available and useful in the instant invention include ARQUAD® T27W, ARQUAD® 16-29, ARQUAD® C-33, ARQUAD® T50, ETHOQUAD® T/13 ACETATE, all manufactured by Akzo Nobel Surfactants (Chicago, Ill.).

Suitable anionic surfactants are carboxylic, phosphoric and sulfonic acids and their salt derivatives. The anionic surfactants useful in the instant invention are alkyl carboxylates; acyl lactylates; alkyl ether carboxylates; n-acyl sarcosinate; n-acyl glutamates; fatty acid-polypeptide condensates; alkali metal sulforicinates; sulfonated glycerol esters of fatty acids, such as sulfonated monoglycerides of coconut oil acids; salts of sulfonated monovalent alcohol esters, such as sodium oleylisethionate; amides of amino sulfonic acids, such as the sodium salt of oleyl methyl tauride; sulfonated products of fatty acids nitriles, such as palmitonitrile sulfonate; sulfonated aromatic hydrocarbons, such as sodium alpha-naphthalene monosulfonate; condensation products of naphthalene sulfonic acids with formaldehyde; sodium octahydroanthracene sulfonate; alkali metal alkyl sulphates, ether sulphates having alkyl groups of 8 or more carbon atoms and alkylarylsulfonates having 1 or more alkyl groups of 8 or more carbon atoms.

Anionic surfactants commercially available and useful in the instant invention include POLYSTEP® A4, A7, A11, A15, A15-30K, A16, A16-22, A18, A13, A17, B1, B3, B5, B11, B12, B19, B20, B22, B23, B24, B25, B27, B29, C-OP3S; ALPHA-STEP® ML40, MC48; STEPANOL™ MG; all produced by STEPAN CO., Chicago, Ill.; HOSTAPUR® SAS produced by HOECHST CELANESE; HAMPOSYL® C30 and L30 produced by W. R. GRACE & CO., Lexington, Mass.

Suitable amphoteric surfactants are glycinates, betaines, sultaines and alkyl aminopropionates. These include cocoamphglycinate, cocoamphocarboxy-glycinates, cocoamidopropylbetaine, lauryl betaine, cocoamidopropylhydroxysultaine, laurylsulataine and cocoamphodipropionate.

Amphoteric surfactants commercially available and useful in the instant invention are REWOTERIC® AM TEG, AM DLM-35, AM B14 LS, AM CAS and AM LP produced by SHEREX CHEMICAL CO., Dublin, Ohio.

Specifically, anionic surfactants include monovalent alkyl carboxylates; polyvalent alkyl carboxylates; acyl lactylates; alkyl ether carboxylates; n-acyl sarcosinate; n-acyl glutamates; and fatty acid polypeptide condensates. Other anionic surfactants are ester linked sulfonates, such as alkyl sulfo esters; taurates; sulfosuccinates, such as monoester, diester (both symmetrical and unsymmetrical), ethoxylated monoalkyl sulfosuccinates, alkyl amide 1/2 ester sulfosuccinate; sulfosuccinamates; sulfonated ethers, (Na cocoglycerol ether sulfonate); linear alkylbenzenesulfonates; benzene, toluene, xylene, cumene sulfonate; ligninsulfonates, such as sulfonated polymers having number average molecular weights of 1,000-20,000; petroleum sulfonates, such as petroleum fractions of differing molecular weights reacted with oleum or $H_2SO_4$ to sulfonate; paraffin sulfonates, such as sulfoxidation of n-paraffins via $UV/SO_3$ secondary alkane sulfonates $C_{14}$-$C_{18}$ (e.g. HOECHST™ SAS); [alpha]-olefin sulfonates; alkylnapthalene-sulfonates; diphenyl oxide sulphonates and linear alkylpolyethersulfonates.

Specific non-ionic surfactants include ethoxylated alcohols, ethoxylated esters, polysorbate esters, ethoxylated amides; polyoxypropylene compounds, such as propoxylated alcohols, ethoxylated/propoxylated block polymers and propoxylated esters; alkanolamides; amine oxides; fatty acid esters of polyhydric alcohols, such as ethylene glycol esters, diethylene glycol esters, propylene glycol esters, glyceryl esters, polyglyceryl fatty acid esters, sorbitan esters, sucrose esters and glucose esters.

Specific cationic surfactants include monoalkyl quaternary ammonium salts, which are hydroxylated or ethoxylated, propoxylated; dialkyl quaternary ammonium compounds; amidoamines; and aminimides. Specific amphoteric surfactants include N-substituted alkyl amides (i.e. fatty acid plus aminoethanolamines, e.g., cocoamphoglycinate or cocoamphocarboxyglycinate); N-alkyl betaines, including alkyl amidobetaines; sulfobetaines, such as laurylsultaine, cocoamidopropylhydroxysultaine; N-alkyl-b-aminopropionates, such as lauraminopropionic acids.

Specific silicone surfactants which improve high temperature stability include branched or linear polyoxyalkylenes. Specific fluorosurfactants include those selected from anionics (such as carboxylates and sulfonics), non-ionics and amphoterics.

The selection of the surfactant in the present invention also influences the clarity of the elastomeric film resulting from the evaporation of water from the dispersion. To obtain clear elastomers from silicone lattices, the refractive index must be matched in the final film between the crosslinked siloxane phase and the surfactant/residual water phase. The term "crosslinked siloxane phase" refers to the plurality of crosslinked siloxane particles remaining after water has evaporated to form an elastomeric film. The term "surfactant/residual water phase" refers to amount of residual surfactant and water remaining in the elastomeric film after the evaporation of substantially all the water from the dispersion.

In addition to adding the surfactant to the siloxane polymer, the mixture also includes a predetermined amount of water. The water is present in the mixture in an amount of 0.5 to 30 parts by weight of siloxane polymer and is preferably present in the amount of 2 to 10 parts. Water may also be added after mixing, in any amount, to dilute the gel phase.

The reaction product (i) may additionally comprise one or more additives such as in-situ resin reinforcers, stabilizers, e.g., pH stabilizers, fillers and the like may also be added to the mixture. The reaction product (i) is produced by mixing the above components at a sufficiently high shear to transform the mixture into a gel phase and by then diluting the gel with water to the desired silicone content.

The reaction product of (a) a siloxane polymer having at least two —OH groups per molecule, or polymer mixture having at least two —OH groups per molecule, having a viscosity of between 5,000 to 500,000 mPa·s at 25° C., and (b) at least one self catalyzing crosslinker reactive with (a), additionally comprising (c) a surfactant and (d) water; typically comprises, excluding additives (i.e. on the basis that the (product of (a)+(b))+(c)+(d) is 100% by weight), 70 to 90% by weight of the reaction product of (a)+(b), 3 to 10% by weight of (c) and 7 to 20% by weight of component (d). Alternatively, excluding additives (i.e. on the basis that the (product of (a)+(b)+(c)+(d) is 100% by weight), 80 to 90% by weight of the reaction product of (a)+(b), 3 to 8% by weight of (c) and 7 to 15% by weight of component (d).

In addition, in situ resin reinforcers, such as methyltrimethoxy silane, vinyltrimethoxy silane, tetraethyl orthosilicate (TEOS), normal propylorthosilicate (NPOS) may be added with the self catalyzing crosslinker. It is believed that adding in situ resin reinforcers to the polydiorganosiloxane/self catalytic crosslinker mixture forms an in situ resin having a highly branched and crosslinked structure, which results in improved physical properties of the elastomer, particularly the tensile, elongation and hardness properties. It also results in improved clarity of the resulting elastomer.

Stabilizers may also be added to the composition. These may comprise any suitable stabilizer, for example a pH stabilizer or any aminosilane containing polymeric or neat aminosilane will function as a stabilizer. Neat aminosilanes include compounds of the formula

$(R^4O)_{3-n}R^4{}_nSiQ^1NR^4{}_yH_{2-y}$ where n and y are independently 0, 1 or 2; $R^4$ is the same or different alkyl chain of 1 to 8 carbon atoms inclusive, $Q^1$ is $(CH_2)_z$ or $\{(CH_2)_zN(R^4)\}_2$, where z is an integer from 1 to 10 and w is from 0 to 3 inclusive.

Polymeric amino silanes may also be used in the practice of the present invention, such as reaction products of silanol functional siloxane fluids and aminosilanes or silanol functional siloxane fluids and alkoxysilanes and aminosilanes. For example, one useful polymeric amino siloxane particularly useful has the formula:

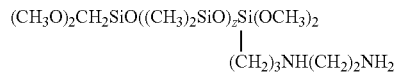

$(CH_3O)_2CH_2SiO((CH_3)_2SiO)_zSi(OCH_3)_2$
$|$
$(CH_2)_3NH(CH_2)_2NH_2$ where z is from 3 to 40.

To prepare the compositions of the instant invention, siloxane polymer (a) and the self catalyzing crosslinker (b) are mixed. Water (d) and surfactant (c) are then added to the siloxane polymer (a) and the self catalyzing crosslinker (b) is mixed in until a high solids gel phase is formed. Any type of mixing equipment may be used including low shear mixing equipment, such as Turrello™, Neulinger™ or Ross™ mixers. The gel will also exhibit excellent shelf stability and may be stored for long periods of time or even transported if required. The other ingredients of the composition may be introduced during the preparation of the pre-cured dispersion or alternatively may be added into the composition in any suitable order prior to use and after mixing, the resulting composition may be diluted with water to the desired silicone content. Both the dispersion alone and the composition may be stored for long periods of time and will exhibit excellent freeze/thaw stability.

The cross-linked polysiloxane dispersion composition may then be mixed with the other ingredients prior to use or dispensed and will form an elastomeric film upon the evaporation of water. The method of treating a substrate may include applying the cross-linked polysiloxane dispersion to the substrate. As such, the method of treating a substrate may further comprise evaporating water from the cross-linked polysiloxane dispersion composition after the cross-linked polysiloxane dispersion composition is applied to the substrate to form a silicone latex elastomer on the substrate. The step of evaporation of water may be performed under ambient, or atmospheric conditions at the location of the substrate when the cross-linked polysiloxane dispersion composition is applied. Alternatively, the step of evaporation of water may be performed under artificially heated conditions, produced by one or more heaters.

Once prepared, the aforementioned reaction product (i) may be mixed with the other ingredients of the composition in any suitable order. It will be appreciated that all compositions determined by wt % add up to a total of 100 wt %. The cross-linked polysiloxane dispersion composition will typically comprise from 30 to 80 wt %, alternatively 30 to 60 wt %, alternatively 35 to 50 wt % of reaction product (i) as hereinbefore described.

The cross-linked polysiloxane dispersion composition also comprises one or more fillers. Suitable fillers include, for the sake of example, colloidal silica, silica powders made by combustion (fumed silica) and precipitation (precipitated silica), semi-reinforcing agents, such as diatomaceous earths or ground quartz. Nonsiliceous fillers may also be added, such as, calcium carbonate, hydrated alumina, magnesium hydroxide, carbon black, titanium dioxide, aluminium oxide, vermiculite, zinc oxide, mica, talcum, iron oxide, barium sulphate, slaked lime, kaolin, calcined kaolin, wollastonite, and hydroxyapatite.

Other fillers which might be used alone or in addition to the above, include aluminite, calcium sulphate (anhydrite), gypsum, calcium sulphate, magnesium carbonate, clays such as aluminium trihydroxide, graphite, copper carbonate, e.g., malachite, nickel carbonate, e.g., zarachite, barium carbonate, e.g., witherite and/or strontium carbonate, e.g., strontianite; aluminium oxide, silicates from the group consisting of olivine group; garnet group; aluminosilicates; ring silicates; chain silicates; and sheet silicates. The olivine group comprises silicate minerals, such as, but not limited to, forsterite and $Mg_2SiO_4$. The garnet group comprises ground silicate minerals, such as, but not limited to, pyrope; $Mg_3Al_2SiO_{12}$; grossular; and $Ca_2Al_2Si_3O_{12}$. Aluninosilicates comprise ground silicate minerals, such as, but not limited to, sillimanite; $Al_2SiO_5$; mullite; $3Al_2O_3.2SiO_2$; kyanite; and $Al_2SiO_5$. The ring silicates group comprises silicate minerals, such as but not limited to, cordierite and $Al_3(Mg,Fe)_2[Si_4AlO_{18}]$. If necessary, liquid alkoxysilanes which are soluble in the siloxane polymer (a) may also be added with the filler to compatibilise the filler with the siloxane polymers.

The selection and addition of particular fillers to our compositions, such as certain types of silicas, may improve the physical properties of the resulting elastomer, particularly tensile properties, elongation properties, hardness and heat stability.

Typically the filler(s), when present are present in an amount of from 10 to 200 weight parts of filler per 100 wt parts of siloxane polymer (a), alternatively from 15 to 100 weight parts of filler per 100 wt parts of siloxane polymer (a). Hydrophobing agents may be provided to treat the aforementioned filler(s) to render them hydrophobic and therefore more easily mixed with reaction product (i) the hydrophobing agents may be for example silanes, e.g., alkoxy silanes, silazanes and or short chain (2-20) organopolysiloxanes or alternatively stearates or the like.

Elastomers containing ammonium stabilized silicas are heat stable, while sodium stabilized silicas are not. Acidic silicas, (those containing $H^+$ as a stabilizer) also yield heat stable elastomers. In general, colloidal or dispersed silica which is not stabilized by Group IA or IIA elements of the periodic chart, will also yield heat stable elastomers. Volatile organic amines and volatile inorganic bases are useful as stabilizers for silicas that would yield heat stable elastomers, e.g., $(R^7)_{3-z}N(H)_x$, where x=0, 1, 2 or 3, $R^7$ is an alkyl or aryl group, such as $(CH_3)_2NH$ or $R^7$ is an alcohol group, such as $N(CH_2CH_2OH)_3$ or $NH(CH_2CH_2OH)_2$. The volatile organic amines include cyclohexylamine, triethylamine, dimethylaminomethylpropanol, diethylaminoethanol, aminomethyl propanol, aminobutanol, monoethanolamine, monoisopropanolamine, dimethylethanolamine, diethanolamine, aminoethylpropanediol, aminomethylpropanesiol, diisopropanolamine, morpholine, tris(hydroxymethyl)aminomethane, triisoproanolamine, triethanolamine, aniline and urea. In addition to the volatile organic amines, volatile inorganic bases, such as ammonia and ammonium carbonate, also yield heat stable elastomers.

The composition may also contain one or more rheology modifiers, such as, natural and modified natural materials, such as, for example starch, modified starch, cellulose, modified cellulose, proteins, and modified proteins. Alternatively, the rheology modifiers may be synthetic including, for example, (optionally hydrophobically treated) alkali swellable emulsions of homo-polymers of (meth)acrylic acids and copolymers thereof with methacrylate esters, hydrophobically modified ethoxylated urethane resin, dimeric and trimeric fatty acids and/or imidazolines. Furthermore, the rheology modifiers, when utilized, are present in an amount of from 0.25 wt % to 5 wt % of the composition.

The composition may also comprise one or more pigments, such as carbon black or titanium dioxide, and may also be added as fillers. Since these fillers are only intended to affect the color of the cured silicone latex elastomer, they are typically added at 0.1 to 20 weight parts, preferably from 0.5 to 10 weight parts, per 100 weight parts of siloxane polymer. Titanium dioxide has been found to be particularly useful as an ultraviolet light screening agent.

The composition may also comprise additional additives, such as preservatives, buffers, fire retardants, coalescents, disinfectants, corrosion inhibitors, antioxidants, antifoams and biocides (optionally encapsulated), antifreeze materials, such as polypropylene glycol and/or buffers.

Those skilled in the art will recognize that these cross-linked, oil in water dispersions may be prepared in other ways. For instance, the siloxane polymer and self catalytic crosslinker mixture may be added to a surfactant and water solution and then emulsified using colloid mills, homogenizers, sonolaters or other high shear devices as described in U.S. Pat. Nos. 5,037,878 and 5,034,455.

The dispersion may be formed by either a batch process, as described above, or a continuous process. If a continuous process is used, then a low shear dynamic mixer or static mixer is preferred.

The liquid coating may be spray-applied, brushed, rolled, trowelled or otherwise coated onto a substrate although spraying techniques are preferred. Once applied as a coating on the substrate the composition will form an elastomeric film upon the evaporation of water although it is to be noted that no cure reaction takes place upon application to a substrate the coating merely dries on the substrate surface, typically through water evaporation.

Also given that the siloxane is pre-cured it was believed that such compositions would be unable to successfully pass tests such as the Self Sealability (Head of Water) Test described in Section 8.9 of ASTM D1970-09 because it was not expected that the film would be able to self-heal in order to maintain its integrity and prevent water ingress etc. In both cases the composition as hereinbefore described has unexpectedly proven to meet the necessary requirements for these two matters. Furthermore, the coating as described herein has the added advantage over many currently available air/water barrier coatings in that it is compatible with other silicone based products such as adhesives, caulks and sealants.

Hence, the present composition may be used as a vapour permeable air and water barrier coating in any building requiring same, for example, cavity wall systems in climatic regions where the provision of air and water barriers which are permeable to (water) vapour are beneficial and when the structure of the cavity wall is designed appropriately. As the skilled man appreciates, cavity wall systems vary in structure to accommodate the local climate, i.e., the relative positions of the insulation and air/water barrier in the cavity wall system as the coating is provided to enable the diffusion of water vapour through the coating and is intended to be applied on a substrate with a view to prevent the risk of moisture getting trapped in the wall cavity. The composition herein is particularly suited for environments in which high levels of (water) vapour permeability are advantageous because of the surrounding climate. As will be seen below the composition herein has a better Water Vapour Transmission in accordance with ASTM E96/E96M-10 Dry Cup Desiccant Method, of greater than 7 US Perm (400.49 ng·s$^{-1}$m$^{-2}$ Pa$^{-1}$) and a Wet Cup Method of greater than 24 US perms for coatings of 15 mil (0.381 mm). It is particularly to be noted that these dry cup results for coatings of 15 mil (0.381 mm) thickness are surprisingly different from the product described in WO2012/064611.

The composition herein may be used as a vapour permeable air/water barrier on any suitable substrate, such as for example masonry substrates, such as concrete block, fluted block, brick, stucco, synthetic stucco, poured concrete, pre-cast concrete, insulation finish systems (EIFS), shotcrete, gypsum as well as gypsum board, wood, plywood and any other interior surfaces requiring said barrier coating. The substrate may be located on either the interior or exterior of load bearing supports of a wall assembly. Indeed the substrate may be the aforementioned load bearing support, e.g., a concrete masonry unit (CMU). Before the cross-linked polysiloxane dispersion composition described above is dried, the wall assembly comprises cross-linked polysiloxane dispersion composition disposed on the substrate as described above. However, after the cross-linked polysiloxane dispersion composition is dried, the wall assembly comprises a vapour permeable air and water barrier coating formed from drying or evaporating the cross-linked polysiloxane dispersion composition described above.

It is known that silicones have excellent overall durability, including ultraviolet radiation exposure on buildings. An air barrier needs to withstand a certain amount of ultraviolet radiation during the time period after installation and before the exterior building façade is installed. Some air barriers have a limited exposure time before the manufacturer recommends covering the air barrier with the building façade. As the current invention is a silicone-based material the ultraviolet durability allows the air barrier to be exposed indefinitely to the atmosphere or for at least a long period of time which could enable greater flexibility during construction or in the event of delays on the jobsite.

Many vapour permeable air and water barrier coatings are organic solvent based and therefore have problems meeting today's increasingly stringent environmental volatile organic compounds requirements. The fact that the composition as hereinbefore described is a water based material results in the present composition avoiding such problems. Coating materials must meet the ever increasingly stringent environmental requirements in order to be allowed to be placed on the market in countries and states around the world. In the United States specific limits must be met for volatile organic compounds (VOCs). At the time of writing, the strictest of these limits is the South Coast Air Quality Management District Rule 1113. In order to meet the requirements of this Rule, liquid applied, vapour permeable air and water barrier coatings must have VOCs less than 50 g/L in order to be used in areas regulated by SCAQMD. The material as hereinbefore described has a 1 gram of VOCs per liter of material when measured using the exclusive method and 2 g/L inclusively. Many other materials (especially those which are solvent based) do not meet this requirement, but the present composition has a VOC of <2 g per liter in accordance with (US Environmental Protection Agency (EPA) Method 24.

Whilst the majority of commercially available coatings cure to a minimum 40 mil (1.016 mm) thickness and often require even thicker coatings the present invention may be coated on a substrate at a thickness of 10 mil (0.254 mm) to 30 mil (0.762 mm) and still meets all necessary tests as will be noted in the following examples avoiding problems encountered with many commercial alternatives which require significantly thicker coatings (e.g., >50 mil (1.27 mm)) especially as it is recognised that very thick coatings of air/water barriers can interfere with diffusion. It is to be noted that the present composition contains a pre-cured polysiloxane network prior to application and as such the coating is applied and merely dries on the substrate rather than having the additional need to cure. The composition as hereinbefore described is suitable for providing an evenly distributed coating across the whole surface of a substrate, even when said substrate has an uneven surface and/or is porous.

The coating composition as described herein, when applied onto a substrate, provides substrates with long-term protection from air and water infiltration, normal movement imposed by seasonal thermal expansion and/or contraction, ultra-violet light and the weather. It maintains water protection properties even when exposed to sunlight, rain snow or temperature extremes. Indeed the composition when tested in accordance with ASTM 1970-09, section 8.6 for low temperature flexibility using a sample having a 15 mil (0.381 mm) coating thickness, passed the test proving that the composition, once applied, remains flexible at low temperatures.

One particular advantage over other products is that the coating composition as described herein, when applied onto a substrate, may be exposed for an extended or even indefinite period of time prior to the application of exterior cladding.

The present invention will now be described in detail by way of the following Examples in which all viscosity measurements were taken at 25° C. using a recording Brookfield viscometer with Spindle 3 at 2 rpm according to ASTM D4287-00(2010) unless otherwise indicated.

Preparation of Composition

The preformed silicone latex emulsion was prepared by introducing about 2 parts by weight of

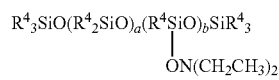

(where each $R^4$ group is a methyl group) into 100 parts by weight of a hydroxyl dimethyl silyl terminated polydimethylsiloxane having a viscosity of 50,000 mPa·s at 25° C. using a recording Brookfield viscometer with Spindle 3 at 2 rpm according to ASTM D4287-00(2010) in a Turrello mixer. 4 parts of a 1:1 solution of water and surfactant (TERGITOL TMN-10) were then added and the resulting mixture was mixed until a high solids emulsion gel was formed. The resulting pre-formed silicone latex emulsion was then suitable for mixing with the other ingredients of the composition.

A composition as hereinbefore described was then prepared by mixing the following ingredients together:
- 40.8 wt % of the previously prepared preformed silicone latex emulsion
- 23.14 wt % of colloidal silica
- 9.72 wt % ultrafine calcium carbonate
- 9.72 wt % Dupont Ti-PURE® R-706 titanium dioxide pigment
- 14.3 wt % water
- 0.75 wt % TERGITOL TMN-10 surfactant
- 0.91 wt % of rheology modifier
- 0.66 wt % of antifoam Once the composition was thoroughly intermixed it was de-aired under vacuum and filtered prior to use.

Air Permeance

Samples of the composition prepared as described above were then applied onto an air permeable polyethylene (PE) substrates in the case of 8 mil (0.2032 mm) samples and polyethylene substrates in the case of 15 mil (0.381 mm) thickness samples and allowed to dry to the thickness values identified in Table 1 below. The resulting dry silicone elastomeric coatings were removed from respective substrates and tested according to ASTM E2178-11, Standard Test Method for Air Permeance of Building Materials (i.e. the rate of air flow (L/s), per unit area ($m^2$) of a material per unit static pressure differential (Pa)), however the test pieces used for the 8 mil (0.02032 mm) thickness samples had an overall size of 360 mm length×360 mm (width) instead of 1 m×1 m specified. A scaled pressure chamber with an internal opening of 305 mm×305 mm was therefore used to conduct the 8 mil (0.2032 mm) thickness samples. The 15 mil (0.381 mm) thickness samples were measured in complete accordance with ASTM E2178-11, Standard Test.

TABLE 1a

| Air Permeance Results at a variety of differential Pressures for 8 mil (0.2032 mm) thickness sample: | |
|---|---|
| Differential Pressure (Pa) | Air Permeance (L/s per $m^2$) |
| 25 | 0.0012 |
| 50 | 0.0021 |
| 75 | 0.0029 |
| 100 | 0.0037 |
| 150 | 0.0052 |
| 300 | 0.0096 |
| 100 | 0.0038 |
| 75 | 0.0029 |
| 50 | 0.0020 |

Current building codes typically set the value required to be below is 0.02 L/s per $m^2$ at a pressure differential of 75 Pa and as such it will be appreciated that the composition as hereinbefore described even at significantly higher differential pressures serves as an air barrier. It should also be appreciated that the thickness of the material at which this coating meets this standards is thinner than a majority of the typical materials used in this market.

TABLE 1b

Air Permeance Results at a variety of differential Pressures for 15 mil (0.381 mm) thickness sample:

| Differential Pressure (Pa) | Air Permeance (L/s per m$^2$) |
|---|---|
| 25 | 0.00144 |
| 50 | 0.00312 |
| 75 | 0.00494 |
| 100 | 0.00682 |
| 150 | 0.01086 |
| 300 | 0.02428 |
| 100 | 0.00688 |
| 75 | 0.00504 |
| 50 | 0.00326 |

As with the 8 mil (0.2032 mm) thickness samples it will be appreciated that the composition as hereinbefore described even at significantly higher differential pressures serves as an air barrier. In this instance the sample was prepared on an air permeable fibreboard in order to withstand the rigors of the test. It will be appreciated that there is a higher probability of pin-holes in the fibreboard material that will result in the higher air permeability. Also, due to the nature of the fibreboard, it is more difficult to ensure such a thin film thickness. Fibreboard absorbs some of the material.

Water Vapour Transmission Rate

In addition the same silicone latex emulsion was tested according to ASTM E96/E96M-10, Standard Test Method for Water Vapour Transmission Rate of Materials (i.e. the steady water vapor flow in unit time through unit area of a body, normal to specific parallel surfaces, under specific conditions of temperature and humidity at each surface.

TABLE 2a

Water Vapour Transmission Results using a sample as hereinbefore described in accordance with ASTM E96/E96M-10:

| Thickness (mil/(mm)) | Water Vapour Transmission Dry Cup Desiccant Method (US Perm (ng/Pa · s · m$^2$)) | Water Vapour Transmission Wet Cup Water Method (US Perm (ng/Pa · s · m$^2$)) |
|---|---|---|
| 10 (0.254) | 7.16 (409.65) | 30.34 (1735.86) |
| 15 (0.381) | 7.03 (402.21) | 24.26 (1388) |
| 20 (0.508) | 4.77 (272.91) | 19.97 (1142.56) |

The above values were compared with published values for commercial products according to the publically available data from the Air Barrier Association of America in relation to water vapour transmission values measured in accordance with ASTM E96/E96M-10 which are provided in Table 2b below:

TABLE 2b

Water Vapour Transmission Results of Commercial Products in accordance with ASTM E96/E96M-10 as available from the Air Barrier Association of America:

| Commercial Product | Water Vapour Transmission Dry Cup Desiccant Method (US Perm (ng s$^{-1}$ · m$^{-2}$ · Pa$^{-1}$)) | Water Vapour Transmission Wet Cup Water Method (US Perm (ng s$^{-1}$ · m$^{-2}$ · Pa$^{-1}$)) |
|---|---|---|
| Momentive SilShield AWB @ 26 mils (0.66 mm) (wet) | 4.273 (244) | 5.493 (314) |
| WR Grace Perm-A-Barrier VP @ 40 mils (1.016 mm) (dry) | 0.60 (34.39) | 12.9 (741.6) |
| Henry Air Bloc 31 MR @ 44 mils (1.12 mm) (dry) | 0.57 (32.0) | 36.12 (2066) |
| Henry Air Bloc 32MR @118 mils (3.00 mm) (wet) | 0.23 (13.0) | 1.02 (58) |
| Henry Air Bloc 33 MR @ 59 mils (1.50 mm)(dry) | 0.34 (19.0) | 11.4 (652) |
| Henry Air Bloc 06 WB @ 59 mils (1.50 mm) (dry) | 0.34 (19.0) | 11.4 (652) |
| Carlisle Barritech VP @ 60 mils (1.524 mm) (wet) [40 mils (1.016 mm) (dry)] | 0.719 (41.1) | 14.295 (817) |
| BASF Enershield HP @ 10 mils (0.254 mm) (wet) | 0.10 (5.81) | 17.6 (1004) |
| Dupont - Tyvek Fluid Applied WB @ 10 mils (0.254 mm) (wet) | 11.48 (656) | 24.23 (1384) |
| Prosoco R-Guard Spray Wrap @ 12 mils (0.305 mm) (wet) | 0.12 (6.86) | 3.54 (202) |
| Warnock Hersey Sto Gold Coat@ 12 mils (0.305 mm) (wet) | 0.12 (6.86) | 3.54 (202) |

It is important to note that the Water Vapor Permeance value of the material as depicted in Table 2a, when tested using the desiccant cup method, is greater than other materials in the market (depicted in Table 2b), including the material found in Momentive SilShield™ which is believed to be the commercial product manufactured by the proprietors of WO2012/064611, Industry scientists have argued that the desiccant method is more realistic than the wet cup method because it relies on the transfusion of vapour from the air through the material and not on a standing cup of water to ensure diffusion of water through the material. The wet cup method allows water droplets to form on the underside of the material being tested; this allows vapour to move through the material via direct contact. The material is not typically found in areas with standing water in this application. ICC-ES AC38 for building wrap materials used in the same application require only the desiccant test method for these same reasons.

Self Sealability

Further samples of coated substrate were analysed in accordance with the Self Sealability (Head of Water) Test described in Section 8.9 of ASTM D1970-09. This test describes nail sealability requirements of bituminous roofing systems but is a commonly used standard for air barrier materials. The test was carried out on samples prepared as required by the Test Method, at several coating thicknesses of the dried coating as hereinbefore described and each coating passed the test as indicated in Table 3 below:

TABLE 3

| Thickness mil (mm) | Self Sealability |
|---|---|
| 10 (0.254) | Pass |
| 15 (0.381) | Pass |
| 20 (0.508) | Pass |

Elastomeric materials do not innately have a self-sealing property. By definition, elastomeric materials will return to their original state after being stressed within its elastic range, but that does not mean that the material will return back to its original state after the elastic range has been surpassed and the material has torn. The fact that the material as hereinbefore described is a pre-cured silicone emulsion that dries and does not cure upon application, was originally considered to render it very likely to fail the above test because it was not anticipated that the material would keep a tight enough seal to maintain the required water head once the dried matrix of the material was broken by a nail applied during the test, especially at such low thicknesses as depicted in Table 3 above. In comparison the material described in WO2012/064611 differs in that it is a material which cures subsequent to application.

Flame Spread and Smoke Developed Indices Based Upon a Single Test Conducted in Accordance with ASTM E 84-12a The method, designated as ASTM E 84-12a "Standard Method of Test for Surface Burning Characteristics of Building Materials", is designed to determine the relative surface burning characteristics of materials under specific test conditions. Results are expressed in terms of Flame Spread Index (FSI) and Smoke Developed (SD).

A composition as hereinbefore described was applied onto a 0.25 inch (6 mm) reinforced fibreglass cement board substrate to a thickness of approximately 15 mil (0.381 mm). The following tests were carried out in accordance with ASTM E 84-12a excepting that whilst Section 5.1.9.1 of ASTM E 84-12a specifies a single combination of lamp and photocell to create the requisite photometer system, in the present test a specially-designed, modern photometer system that is utilized by many other tunnel systems worldwide was used.

Test Results

Flame Spread Index (FSI) gave a value of 10 and Smoke Developed (SD) gave a value of 85.

The air leakage of a sample air barrier comprising the composition as hereinbefore described was determined in accordance with ASTM E2357-11 (standard test method for determining air leakage of air barrier assemblies in US) and it gave the results of 0.000007 cfm/ft$^2$ at 1.57 psf (75.2 Pa) and 0.00003 L/s per m$^2$ at 75 Pa. The assembly was also tested in accordance with CAN/ULC-5742 and it gave the results of a Class 1A rating. ASTM E2357-11 is utilized in an attempt to mimic real world conditions by preparing two exterior wall mock-ups with one mock-up being a simple wall assembly with sheathing joints and the other being constructed with sheathing joints; roof and foundation tie-ins; brick ties, window openings; and electrical, pipe and ductwork penetrations. Each of the tie-ins and penetrations is fully sealed with sealant and/or pre-cured extrusions and flashed to the air barrier assembly to ensure it can withstand the simulated conditions. Then both wall mock-ups were exposed to positive and negative sustained wind loads as identified within the test method.

The invention claimed is:

1. A cross-linked polysiloxane dispersion composition, for an air and water barrier coating composition, comprising
   (i) a crosslinked polysiloxane dispersion of: a reaction product of (a) a siloxane polymer having at least two —OH groups per molecule, or siloxane polymer mixture having at least two —OH groups per molecule, having a viscosity of between 5000 to 500,000 mPa·s at 25° C., and (b) at least one self catalyzing crosslinker reactive with (a), and additionally comprising (c) a surfactant and (d) water;
   together with one or more rheology modifiers and optionally together with one or more of the following ingredients:
   (ii) one or more fillers selected from the group of colloidal silica, fumed silica, precipitated silica, diatomaceous earths, ground quartz, kaolin, calcined kaolin, wollastonite, hydroxyapatite, calcium carbonate, hydrated alumina, magnesium hydroxide, carbon black, titanium dioxide, aluminium oxide, vermiculite, zinc oxide, mica, talcum, iron oxide, barium sulphate and slaked lime or a mixture thereof; and
   (iii) one or more stabilizers;
   wherein the polysiloxane dispersion composition is a liquid, and
   wherein the cross-linked polysiloxane dispersion composition, once dried on a substrate, meets the requirements of ASTM E2178-11, Standard Test Method for Air Permeance of Building Materials, having an Air Permeance (L/s per m$^2$) of less than 0.006 at a differential pressure of 75 Pa at thicknesses of 10 mil (0.254 mm) and 15 mil (0.381 mm).

2. The cross-linked polysiloxane dispersion composition of claim 1 wherein the air and water barrier coating composition is a vapour permeable air and water barrier coating composition.

3. The cross-linked polysiloxane dispersion composition of claim 1 wherein the cross-linked polysiloxane dispersion composition when applied on to a substrate at a wet thickness of from 20 mil (0.508 mm) to 60 mil (1.524 mm), dries subsequent to application to a dry thickness of from 10 mil (0.254 mm) to 30 mil (0.762 mm).

4. The cross-linked polysiloxane dispersion composition of claim 1 wherein the cross-linked polysiloxane dispersion composition once dried, has a Water Vapour Transmission of greater than 7 US Perm (400.5 ng·s$^{-1}$m$^{-2}$ Pa$^{-1}$), according to the Dry Cup Desiccant Method of ASTM E96/E96M-10 for both the 10 mil (0.254 mm) and 15 mil (0.381 mm) thicknesses; and, Standard Test Method for Water Vapour Transmission rate of Materials and in accordance with Water Vapour Transmission Wet Cup Water Method of ASTM E96/E96M-10, Standard Test Method for Water Vapour Transmission rate of Materials of greater than 30 US Perm (1716.41 ng·s$^{-1}$m$^{-2}$ Pa$^{-1}$) for coatings of 10 mil (0.254 mm) thickness and greater than 24 US Perm (1373.12 ng·s$^{-1}$m$^{-2}$ Pa$^{-1}$) for coatings of 15 mil (0.381 mm) thickness.

5. The cross-linked polysiloxane dispersion composition of claim 1 applied to a substrate, and wherein the substrate selected from construction sheathing substrate(s), metal substrate(s), masonry substrate(s), galvanized metal substrate(s) and wood framing substrate(s) and any combination thereof.

6. The cross-linked polysiloxane dispersion composition of claim 1 wherein the cross-linked polysiloxane dispersion composition comprises, excluding additives (i.e. on the basis that the (product of (a)+(b))+(c)+(d) is 100% by weight), 70 to 90% by weight of the reaction product of (a)+(b), 3 to 10% by weight of (c) and 7 to 20% by weight of component (d).

7. A method for decreasing the vapour permeability of a water and air barrier treated substrate by treating a substrate with a liquid applied, vapour permeable air and water barrier coating composition comprising a cross-linked polysiloxane dispersion composition comprising
   (i) a crosslinked polysiloxane dispersion of: a reaction product of (a) a siloxane polymer having at least two —OH groups per molecule, or siloxane polymer mixture having at least two —OH groups per molecule, having a viscosity of between 5,000 to 500,000 mPa·s at 25° C., and (b) at least one self catalyzing crosslinker reactive with (a), and additionally comprising (c) a surfactant and (d) water;

together with one or more rheology modifiers and one or more of the following ingredients:

(ii) one or more fillers selected from the group of colloidal silica, fumed silica, precipitated silica, diatomaceous earths, ground quartz, kaolin, calcined kaolin, wollastonite, hydroxyapatite, calcium carbonate, hydrated alumina, magnesium hydroxide, carbon black, titanium dioxide, aluminium oxide, vermiculite, zinc oxide, mica, talcum, iron oxide, barium sulphate and slaked lime; and (iii) one or more stabilizers;

wherein the cross-linked polysiloxane dispersion composition, once dried on the substrate, meets the requirements of ASTM E2178-11, Standard Test Method for Air Permeance of Building Materials, having an Air Permeance (L/s per m$^2$) of less than 0.006 at a differential pressure of 75 Pa at thicknesses of both 10 mil (0.254 mm) and 15 mil (0.381 mm).

8. The method in accordance with claim 7 wherein the cross-linked polysiloxane dispersion composition is applied on to the substrate at a wet thickness of from 20 mil (0.508 mm) to 60 mil (1.524 mm) and dries subsequent to application to a dry thickness of from 10 mil (0.254 mm) to 30 mil (0.762 mm)).

9. The method in accordance with claim 7 wherein the cross-linked polysiloxane dispersion composition, once dried on the substrate meets Water Vapour Transmission Dry Cup Desiccant Method in accordance with ASTM E96/E96M-10, Standard Test Method for Water Vapour Transmission rate of Materials of greater than 7 US Perm, for both the 10 mil (0.254 mm) and 15 mil (0.381 mm), and Water Vapour Transmission Wet Cup Water Method in accordance with ASTM E96/E96M-10, Standard Test Method for Water Vapour Transmission rate of Materials of 30 US Perm (1716.41 ng·s$^{-1}$m$^{-2}$ Pa$^{-1}$) for coatings of 10 mil (0.254 mm) thickness and greater than 24 US Perm (1373.12 ng·s$^{-1}$ m$^{-2}$ Pa$^{-1}$) for coatings of 15 mil (0.381 mm) thickness.

10. The method in accordance with claim 7 wherein the substrate selected from construction sheathing substrate(s), metal substrate(s), galvanized metal substrate(s), wood framing substrate(s), masonry substrates, or gypsum board, wood, or plywood and any combination thereof.

11. The method in accordance with claim 7 wherein the substrate is an interior or exterior load bearing support or is located on either an interior or exterior load bearing support of a wall assembly.

12. The method in accordance with claim 7 wherein the cross-linked polysiloxane dispersion composition comprises, excluding additives (i.e. on the basis that the (product of (a)+(b))+(c)+(d) is 100% by weight), 70 to 90% by weight of the reaction product of (a)+(b), 3 to 10% by weight of (c) and 7 to 20% by weight of component (d).

13. The method in accordance with claim 7 further comprising evaporating water from the cross-linked polysiloxane dispersion composition after the cross-linked polysiloxane dispersion is applied to the substrate.

14. A wall assembly comprising a liquid applied, vapour permeable air and water barrier coating composition comprising a cross-linked polysiloxane dispersion composition comprising (i) a crosslinked polysiloxane dispersion of: a reaction product of (a) a siloxane polymer having at least two —OH groups per molecule, or siloxane polymer mixture having at least two —OH groups per molecule, having a viscosity of between 5000 to 500,000 mPa·s at 25° C., and (b) at least one self catalyzing crosslinker reactive with (a), and additionally comprising (c) a surfactant and (d) water;

together with one or more rheology modifiers and one or more of the following ingredients:

(ii) one or more fillers selected from the group of colloidal silica, fumed silica, precipitated silica, diatomaceous earths, ground quartz, kaolin, calcined kaolin, wollastonite, hydroxyapatite, calcium carbonate, hydrated alumina, magnesium hydroxide, carbon black, titanium dioxide, aluminium oxide, vermiculite, zinc oxide, mica, talcum, iron oxide, barium sulphate and slaked lime; and (iii) one or more stabilizers;

wherein the cross-linked polysiloxane dispersion composition, once dried on a substrate, meets the requirements of ASTM E2178-11, Standard Test Method for Air Permeance of Building Materials, having an Air Permeance (L/s per m$^2$) of less than 0.006 at a differential pressure of 75 Pa at thicknesses of both 10 mil (0.254 mm) and 15 mil (0.381 mm).

15. The wall assembly in accordance with claim 14 wherein the cross-linked polysiloxane dispersion composition is applied on to a substrate at a wet thickness of from 20 mil (0.508 mm) to 60 mil (1.524 mm) and dries subsequent to application to a dry thickness of from 10 mil (0.254 mm) to 30 mil (0.762 mm).

16. The wall assembly in accordance with claim 14 wherein the cross-linked polysiloxane dispersion composition, once dried on a substrate meets Water Vapour Transmission Dry Cup Desiccant Method in accordance with ASTM E96/E96M-10, Standard Test Method for Water Vapour Transmission rate of Materials of greater than 7 US Perm (572.135 ng·s$^{-1}$m$^{-2}$ Pa$^{-1}$), for both 10 mil (0.254 mm) and 15 mil (0.381 mm) thicknesses, and Water Vapour Transmission Wet Cup Water Method in accordance with ASTM E96/E96M-10, Standard Test Method for Water Vapour Transmission rate of Materials of 30 US Perm (1716.41 ng·s$^{-1}$m$^{-2}$ Pa$^{-1}$) for coatings of 10 mil (0.254 mm) thickness and greater than 24 US Perm (1373.12 ng·s$^{-1}$m$^{-2}$ Pa$^{-1}$) for coatings of 15 mil (0.381 mm) thickness.

17. The wall assembly in accordance with claim 14 wherein the substrate selected from construction sheathing substrate(s), metal substrate(s), galvanized metal substrate(s) and wood framing substrate(s), concrete masonry, foam plastic insulated sheeting, exterior insulation, pre-formed concrete, cast in place concrete wood framing, oriented strand board (OSB), exterior sheathing, preformed panels, plywood and wood or steel stud walls, roofing felting for roofing membranes, and non-permeable wall assembly.

18. A wall assembly comprising a silicone latex elastomer applied on a substrate, the silocone latex elastomer formed from evaporating water from composition comprising a cross-linked polysiloxane dispersion composition, the polysiloxane dispersion composition comprising:

(i) a crosslinked polysiloxane dispersion of: a reaction product of (a) a siloxane polymer having at least two —OH groups per molecule, or siloxane polymer mixture having at least two —OH groups per molecule, having a viscosity of between 5000 to 500,000 mPa·s at 25° C., and (b) at least one self catalyzing crosslinker reactive with (a), and additionally comprising (c) a surfactant and (d) water;

together with one or more rheology modifiers and one or more of the following ingredients:

(ii) one or more fillers selected from the group of colloidal silica, fumed silica, precipitated silica, diatomaceous earths, ground quartz, kaolin, calcined kaolin, wollastonite, hydroxyapatite, calcium carbonate, hydrated alumina, magnesium hydroxide, carbon black, titanium dioxide, aluminium oxide, vermiculite, zinc oxide, mica, talcum, iron oxide, barium sulphate and slaked lime; and (iii) one or more stabilizers;

wherein the cross-linked polysiloxane dispersion composition, once dried on a substrate, meets the requirements of ASTM E2178-11, Standard Test Method for Air Permeance of Building Materials, having an Air Permeance (L/s per $m^2$) of less than 0.006 at a differential pressure of 75 Pa at thicknesses of both 10 mil (0.254 mm) and 15 mil (0.381 mm).

19. A cross-linked polysiloxane dispersion composition, for an air and water barrier coating composition, comprising (i) a crosslinked polysiloxane dispersion of: a reaction product of (a) a siloxane polymer having at least two —OH groups per molecule, or siloxane polymer mixture having at least two —OH groups per molecule, having a viscosity of between 5000 to 500,000 mPa·s at 25° C., and (b) at least one self catalyzing crosslinker reactive with (a), and additionally comprising (c) a surfactant and (d) water;

together with one or more rheology modifiers and optionally together with one or more of the following ingredients:

(ii) one or more fillers selected from the group of colloidal silica, fumed silica, precipitated silica, diatomaceous earths, ground quartz, kaolin, calcined kaolin, wollastonite, hydroxyapatite, calcium carbonate, hydrated alumina, magnesium hydroxide, carbon black, titanium dioxide, aluminium oxide, vermiculite, zinc oxide, mica, talcum, iron oxide, barium sulphate and slaked lime or a mixture thereof; and (iii) one or more stabilizers;

wherein the polysiloxane dispersion composition is a liquid, and wherein the cross-linked polysiloxane dispersion composition once dried, has a Water Vapour Transmission of greater than 7 US Perm (400.5 ng·$s^{-1}m^{-2}$ $Pa^{-1}$), according to the Dry Cup Desiccant Method of ASTM E96/E96M-10 for both the 10 mil (0.254 mm) and 15 mil (0.381 mm) thicknesses; and, Standard Test Method for Water Vapour Transmission rate of Materials and in accordance with Water Vapour Transmission Wet Cup Water Method of ASTM E96/E96M-10, Standard Test Method for Water Vapour Transmission rate of Materials of greater than 30 US Perm (1716.41 ng·$s^{-1}m^{-2}$ $Pa^{-1}$) for coatings of 10 mil (0.254 mm) thickness and greater than 24 US Perm (1373.12 ng·$s^{-1}m^{-2}$ $Pa^{-1}$) for coatings of 15 mil (0.381 mm) thickness.

* * * * *